United States Patent [19]
Akashi et al.

[11] Patent Number: 4,739,157
[45] Date of Patent: Apr. 19, 1988

[54] METHOD OF DETECTING THE CORRELATION BETWEEN SIGNALS WITH WEIGHTING

[75] Inventors: Akira Akashi; Akira Ishizaki, both of Yokohama; Yasuo Suda, Yokohama; Keiji Ohtaka, Tokyo; Hiroshi Ohmura, Wako, all of Japan

[73] Assignee: Canon Kabushiki Kaisha, Tokyo, Japan

[21] Appl. No.: 839,951

[22] Filed: Mar. 17, 1986

[30] Foreign Application Priority Data

Mar. 19, 1985 [JP] Japan ................. 60-55145
Mar. 19, 1985 [JP] Japan ................. 60-55146

[51] Int. Cl.$^4$ .................... G01J 1/20; G03B 3/00
[52] U.S. Cl. ...................... 250/201; 354/408
[58] Field of Search ............. 250/201 PF, 204; 354/406, 407, 408

[56] References Cited

U.S. PATENT DOCUMENTS

| | | | |
|---|---|---|---|
| 4,333,007 | 6/1982 | Langlais et al. | 250/201 |
| 4,336,450 | 6/1982 | Utagawa et al. | 250/201 PF |
| 4,500,189 | 2/1985 | Aoki | 250/201 PF |
| 4,573,784 | 3/1986 | Suzuki | 250/201 |
| 4,602,153 | 7/1986 | Suzuki | 354/408 |
| 4,647,174 | 3/1987 | Tsunekawa et al. | 354/402 |

Primary Examiner—David C. Nelms
Assistant Examiner—Michael Messinger
Attorney, Agent, or Firm—Fitzpatrick, Cella, Harper & Scinto

[57] ABSTRACT

A correlation detecting method in which in order to detect the correlation between a pair of electrical signal trains which should effect a correlation operation, the operation is effected while the relative position of the signal trains is shifted and during the operation, the signal levels of at least the opposite ends of each signal train are reduced relative to the signals at a central position of the signal train, thereby mitigating the correlation error attributable to the signals near the ends of the signal trains.

7 Claims, 12 Drawing Sheets

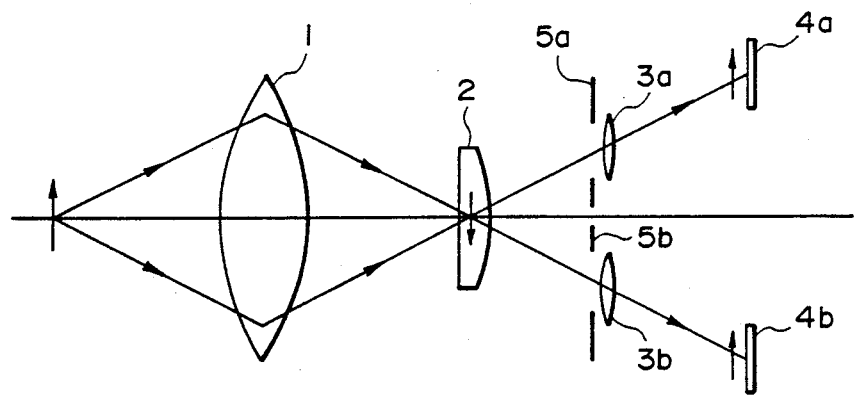
F I G. 1
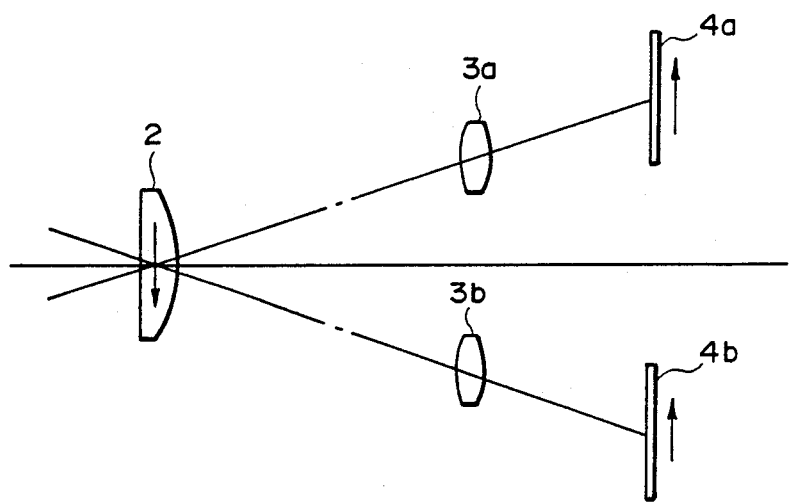
F I G. 2A

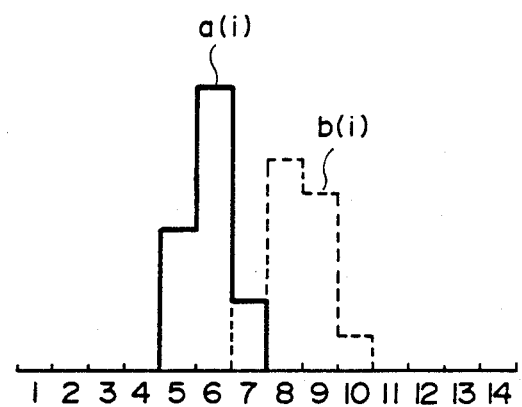
F I G. 3
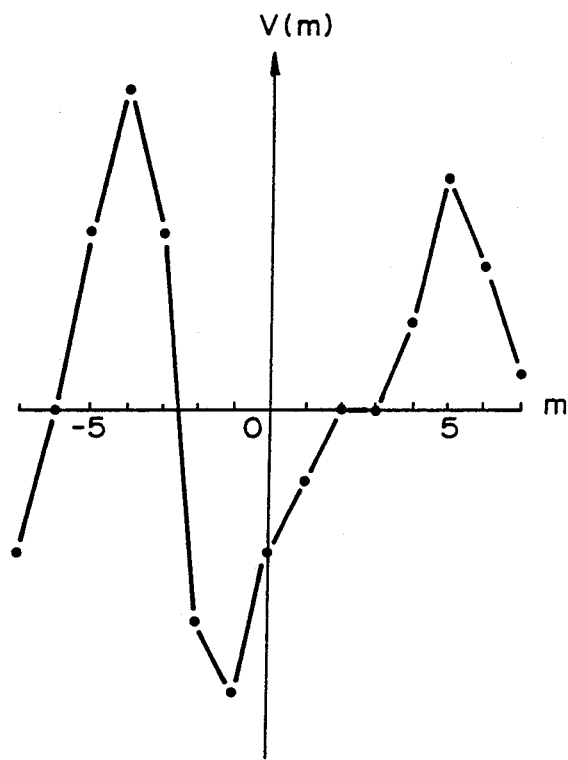
F I G. 4

METHOD OF DETECTING THE CORRELATION BETWEEN SIGNALS WITH WEIGHTING

BACKGROUND OF THE INVENTION

1. Field of the Invention

This invention relates to a method of detecting the degree of correlation, and in particular to a method of detecting the degree of correlation which is improved in detection accuracy and which detects the correlation between image signals or the like and is thereby suitable for a distance detecting device in an automatic control instrument such as a robot, or an auto-focus device applied in the field of the camera or the like.

2. Related Background Art

Detecting the phase relation between two signal trains to thereby detect the degree of correlation therebetween is widely known. Detection of such degree of correlation is used for various purposes, and in such cases, two object image signals obtained from an object are used as the signal trains and from the detection of the correlation between the two signals, the distance to the object is measured, and this is applied to auto-focus devices. For example, as a method of the focus detecting device of a camera, there is known a method whereby the relative deviation between two images formed by dividing the pupil of the photo-taking lens is observed to thereby discriminate the in-focus state. U.S. Pat. No. 4,185,191 discloses, for example, a device wherein a fly-eye lens group is disposed on the predetermined imaging plane of the photo-taking lens of a camera generate two images deviated relative from each other, the deviation corresponding to the amount of defocus of the photo taking lens. Also, Japanese Laid-open patent application Nos. 118019/1980 and 155331/1980 disclose a so-called secondary imaging method whereby aerial images formed on said predetermined imaging plane by two juxtaposed secondary imaging systems are directed to the surface of a solid state image sensor to thereby detect the relative the positional deviation of the respective images. The latter secondary imaging method requires a somewhat great length, but has merit that in it does not require any special optical system.

The principle of this secondary imaging method will hereinafter be briefly described with reference to FIG. 1 of the accompanying drawings. A field lens 2 is disposed coaxially with a photo-taking lens 1 to be focused, and two secondary imaging lenses 3a, 3b are juxtaposed rearwardly of the field lens 2, and light-receiving sensors 4a, 4b are disposed rearwardly of the secondary imaging lenses 3a, 3b. Designated by 5a and 5b are stops provided near the secondary imaging lenses 3a and 3b. The field lens 2 causes the exit pupil of the photo-taking lens 1 to be substantially imaged on the pupil planes of the two secondary imaging lenses 3a and 3b. As a result, light ray fluxes entering the secondary imaging lenses 3a and 3b are those emerging from the regions of equal area on the exit pupil plane of the photo-taking lens 1 which correspond to the respective secondary imaging lenses 3a and 3b and which do not overlap each other. When aerial images formed near the field lens 2 are re-formed on the surfaces of the sensors 4a and 4b by the secondary imaging lenses 3a and 3b, the two re-formed images change their positions on the basis of the difference between the positions in the direction of the optic axis at which said aerial images are formed.

FIG. 2 of the accompanying drawings shows the manner in which such phenomenon occurs. About the in-focus state of FIG. 2A, there are the near focus and the far focus states as in FIGS. 2B and 2C and in these respecitve states, the two images formed on the surfaces of the sensors 4a and 4b move in the opposite direction on the surfaces of the sensors 4a and 4b. If this image intensity distribution is photoelectrically converted by the sensors 4a and 4b and the amount of relative positional deviation of said two images i.e., the degree of correlation between said two images, is detected by the use of an electrical processing circuit, discrimination of the in-focus state can be accomplished.

Various operating and processing methods for detecting the degree of correlation between two images from photoelectrically converted signals have also heretofore been devised. For example, according to Japanese Laid-Open patent application No. 45510/1982, when two photoelectrically converted signals are a(i) and b(i) (i=1, ..., N), processing according to the relation $$V(m) = \sum_i |a(i) - b(i + 1 - m)| - \sum_i |a(i + 1) - b(i - m)| \quad (1)$$

is operated and, when the the two images have become coincident with each other, V(d)=0 and from this, the phase difference d between the two images can be known. The result of the operation of equation (1) having been carried out for the phtoelectrically converted signals (a)i and b(i) as shown, for example, in FIG. 3 of the accompanying drawings is shown in FIG. 4 of the accompanying drawings. It is seen from this that the two images of FIG. 3 have the point of V(d)=0, i.e., the phase difference of d=−2.5 picture elements.

Another operating and processing method is disclosed in Japanese Laid-open patent application No. 107313/1984. That is, the operating method disclosed in this patent application is $$V(m) = \sum_i \min\{a(i), b(i + 1 - m)\} - \sum_i \min\{a(i + 1), b(i - m)\} \quad (2)$$

$$V(m) = \sum_i \max\{a(i), b(i + 1 - m)\} - \sum_i \max\{a(i + 1), b(i - m)\}, \quad (3)$$

wherein {x,y} and max {x,y} are the operators which select the smaller or greater value of x and y. V(m) according to equation (2) or (3), as in equation (1), has such a nature that V(d)=0 when the two images have become coincident with each other, whereby the phase difference between the two images, i.e., the degree of correlation d between the two images, can be detected.

To find a d which is V(d)=0 in reality, it is considered that d which is V(d)=0 exists in a section wherein the sign of V(m) is inverted, for example, in the case of FIG. 4, between [−3 and −2], and d is often found from the values of V(−2) and V(−3) by the straight interpolation. In this case, V(−2)=−300 and V(−3)=250, and
$d = -3 + V(-3)/[V(-3) - V(-2)] \approx -2.5$.

Equations (1) to (3) are the correlation function of the two signals in a broad sense, and in a correlation function of a finite length, the signal area which is the subject of the operation varies with a variable m, as is well known. Therefore, with respect to the signals as shown in FIG. 3 wherein there is no variation in brightness at the ends of the signals, or in other words, there is no information at the ends of the signals, the degree of correlation (the phase difference) can be properly detected by a correlation operation, but in signals wherein there is information also at the ends of the signals as in an ordinary object to be photographed, the information of another signal corresponding to the end of one signal shifts from the operation subject area with the variable m and at that time, an error may be induced. The reason for this will hereinafter be described with reference to FIGS. 5 and 6 of the accompanying drawings.

The image signals of FIG. 5, like the signals of FIG. 3, have a phase difference of −2.5 picture elements, but unlike the signals of FIG. 3, the ends of the image signals of FIG. 5 have reasonable brightness information. The process in which the operation of equation (1) is carried out for these signals is shown in FIGS. 6A–6D of the accompanying drawings. As previously described, the phase difference between these two signals can be found by a straight line interpolation between the values of V(−3) and V(−2). FIGS. 6A and 6B correspond to the first term and the second term, respectively, of $$V(-3) = \sum_{i=1}^{10} |a(i) - b(i + 4)| - \sum_{i=1}^{10} |a(i + 1) - b(i + 3)|$$

Likewise, FIGS. 6C and 6D correspond to the first term and the second term, respectively, of $$V(-2) = \sum_{i=1}^{11} |a(i) - b(i + 3)| - \sum_{i=1}^{11} |a(i + 1) - b(i + 2)|.$$

Here, if V(−3) and V(−2) are actually calculated V(−3)=350 and V(−2)=−450, and the straight-line interpolated value thereof is d≈−2.6 and, when this is compared with the right phase difference, there is an error of 0.1 picture elements. The reason for this is that for V(−2), a signal b(3) was included in the operation subject area, whereas for V(−3), it departed from the subject.

As noted above, the edge portion information in the cut-out signal of a finite length may often cause an error in the operation of the degree of correlation, and it adversely affects not only the operation of the degree of correlation, but also generally the signal processing and therefore, a kind of weight function called a "time window" is often applied to the signal to thereby reduce the signal level of the edge portion of the signal in advance. The process of it will now be described with reference to FIGS. 7 and 8 of the accompanying drawings.

FIG. 7 shows the manner in which a weight function as indicated by C therein is applied to the same object signals a(i) and b(i) as those of FIG. 5. That is, $$a'(i) = w(i) \cdot a(i) \quad (4)$$

$$b'(i) = w(i) \cdot b(i) \quad (5)$$

where i=1, . . . , 14, W(1)=w(14)=0.25, w(2)=w(13)=0.5, w(3)=w(12)=0.75 and w(j)=1.0(j=4, . . . , 11). The process in which the operation of the degree of correlation is carried out for such signals a'(i) and b'(i) is shown in FIG. 8. Like FIG. 6, FIGS. 8A and 8B correspond to the case of V(−3) and FIGS. 8C and 8D correspond to the case of V(−2). Here, if the values of V(−3) and V(−2) are calculated, V(−3)=225 and V(−2)=−337.5 and thus, d=−2.6 and in the case of such object signals and weight function, the error cannot be reduced. The reason for this is that the correlation operation has been effected by multiplying the signals by the weight function only in the no phase difference state of FIG. 7 and therefore the edge portion information of the signal b'(i) in FIG. 8D is not sufficiently attenuated. That is, in the state in the vicinity of the in-focus state wherein the phase difference between the two signals is little, the signal levels of the edge portions of the two signals attenuate in a similar manner and therefore, the effect of the weight function is obtained, but in the signals having a great phase difference therebetween as shown in FIG. 7, the information of one signal corresponding to the edge portion of another signal is not at the end and therefore, it is often the case that the effect of the weight is not obtained.

Although an example of the prior art in which an electrical weight is applied to photoelectrically converted signals has been described with respect to FIGS. 7 and 8, other examples of the prior art in which the same effect is realized by the shape of an optical filter or element are disclosed, for example, in Japanese Laid-open patent applications Nos. 149007/1980 and 87250/1980.

FIG. 9 of the accompanying drawings illustrates the method of Japanese Laid-open patent application No. 149007/1980 in which the signal levels of a picture element of the opposite ends of the same two object signals as those of FIG. 5 are reduced to a half by the effect of an optical filter. The process in which the correlation operation is effected for such signals is shown in FIG. 10 of the accompanying drawings. Like FIG. 6, FIGS. 10A and 10B correspond to the case of V(−3) and FIGS. 10C and 10D correspond to the case of V(−2). Here, if the values of V(−3) and V(−2) are actually calculated, V(−3)=275 and V(−2)=−475 and thus, d=−2.6 and, in the case of such object signals, the error cannot be reduced even if the signal levels of a picture element of the opposite ends are reduced to a half. The reason for this is that the signal levels of the edge portions have been reduced to a half only in the no phase difference state of FIG. 9 and therefore the signal level of the signal b(3) corresponding to the end in FIG. 10D is not reduced. That is, in the state in the vicinity of the in-focus state wherein the phase difference between the two signals is little, the signal levels of the edge portions of the two signals are reduced in a similar manner, whereas in the signals having a great phase difference therebetween as shown in FIG. 9, the information of one signal corresponding to the edge portion of another signal is not at the end and therefore, it is often the case that even if the signal of the edge portion is reduced to a half, the error cannot be mitigated. This problem holds true both in the case where said operation is effected by optical means and in the case where said operation is effected by electrical means.

SUMMARY OF THE INVENTION

It is a first object of the present invention to mitigate the correlation error occurring when the operation of the correlation between signal trains of a finite length is effected.

It is a second object of the present invention to decrease the correlation error occurring due to the brightness signals near the opposite edge portions of the signal trains when the correlation operation is effected.

It is a third object of the present invention to relatively reduce the signal levels of at least the opposite ends of the range in which the signal trains are opposed to each other when the correlation operation is effected while the signal trains are shifted relative to each other.

It is a fourth object of the present invention to operate the correlation between signal trains regarding at least two distributions of light formed by a light beam passed through an objective lens, thereby mitigating the detection error when the focus detection state of the objective lens is detected.

BRIEF DESCRIPTION OF THE DRAWINGS

FIG. 1 illustrates the principle of a focus detecting method using a secondary imaging method to which is applied a method of detecting the degree of correlation in accordance with the present invention.

FIGS. 2A, 2B and 2C illustrate the principle of image deviation in the method shown in FIG. 1.

FIG. 3 shows the electrical signal wave forms of photoelectrically converted signals which are the subjects of focus detection processing in the method shown in FIG. 1.

FIG. 4 is an illustration showing the result of the detection and operation of the degree of correlation between the signals of FIG. 3.

DESCRIPTION OF THE PREFERRED EMBODIMENT

An embodiment of the present invention will hereinafter be described in detail. Summing up the present embodiment, as described above, in each process of the aforedescribed correlation operation V(m), the operation subject signal varying with the variable m is multiplied by a predetermined weight function each time, whereby the influence of the then information of the edge portion is reduced over an entire range of m. That is, when the variable is m, the operation subject signal is multiplied by a weight function wm(i) corresponding to m as follows:

$$a''m(i) = wm(i) \cdot a(i) \quad (6)$$

$$b''m(i) = wm(i) \cdot b(i) \quad (7)$$

and thereafter, the correlation operation of V(m) is carried out, whereby the intended purpose is achieved.

A case where the present embodiment is applied to the above-described focus detecting device will hereinafter be described with reference to FIGS. 11 and 12.

Figure 2B:
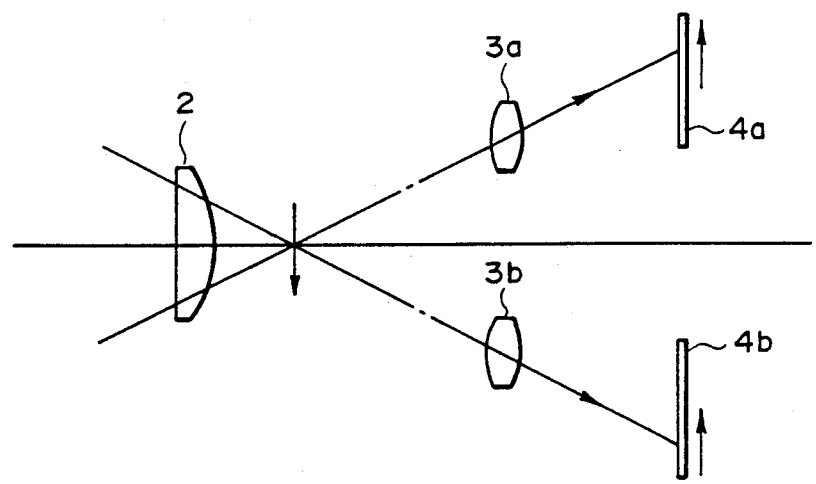
Figure 2C:
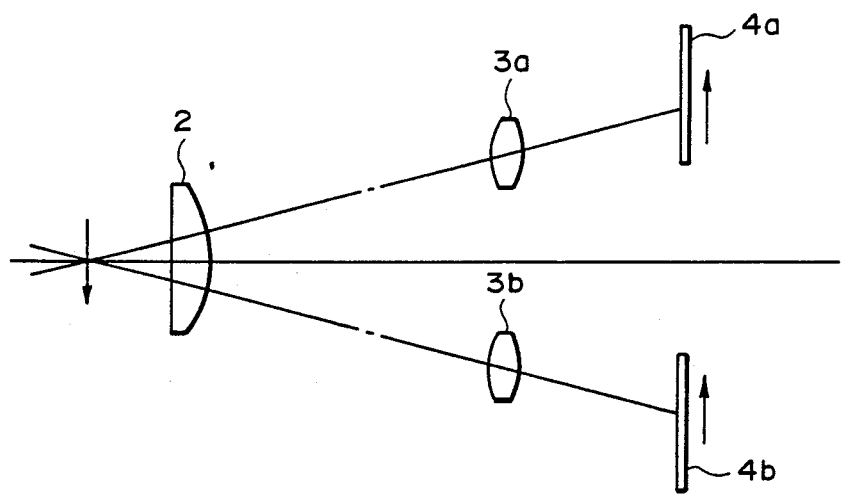
Figure 5:
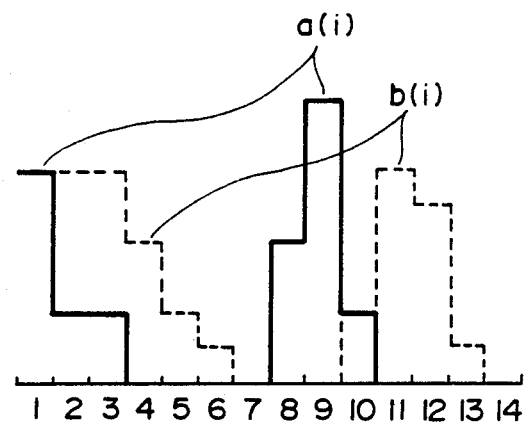
FIG. 5 shows the electrical signal wave forms of photoelectrically converted signals having brightness information at the edge portions thereof in the method shown in FIG. 1.
Figure 6A:
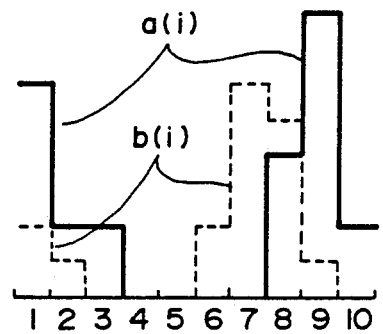
FIGS. 6A, 6B, 6C and 6D illustrate the processes of correlation operation for the signals of FIG. 5.
Figure 6C:
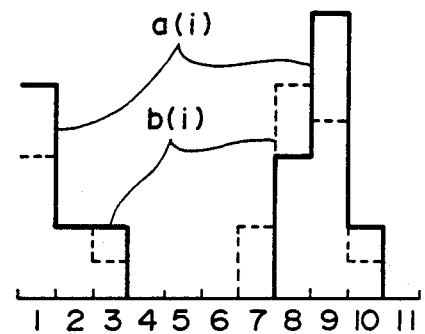
Figure 6B:
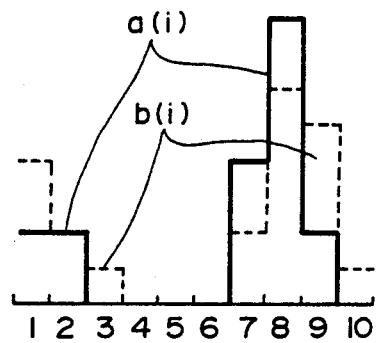
Figure 6D:
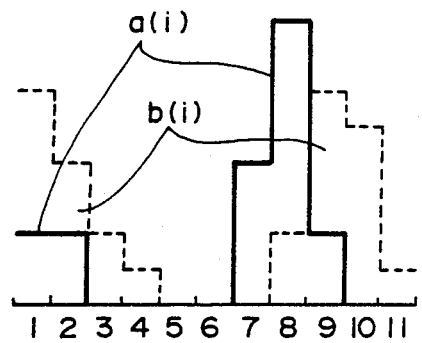
Figure 7:
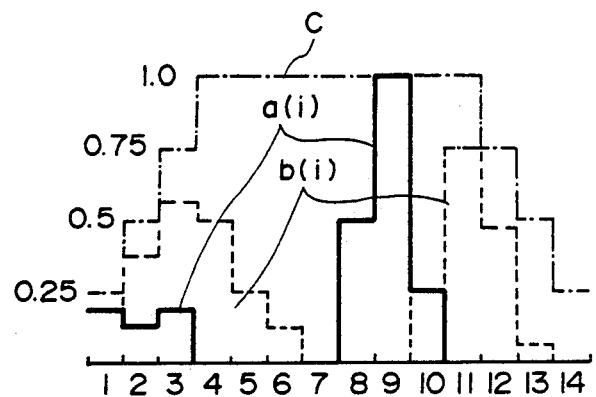
FIG. 7 illustrates the operation when the signals of FIG. 5 are subjected to the weighting based on the prior art.
Figure 8A:
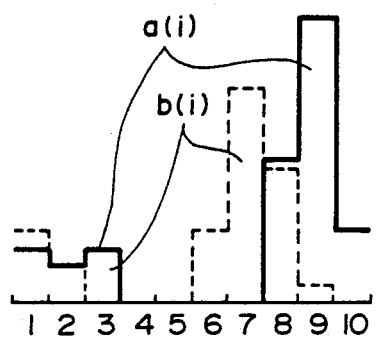
FIGS. 8A, 8B, 8C and 8D illustrate the processes of correlation operation for the signals of FIG. 7.
Figure 8C:
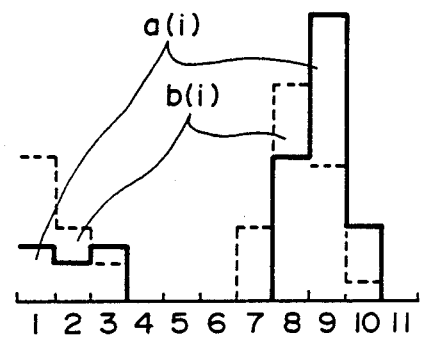
Figure 8B:
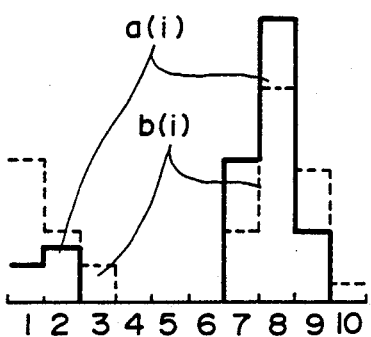
Figure 8D:
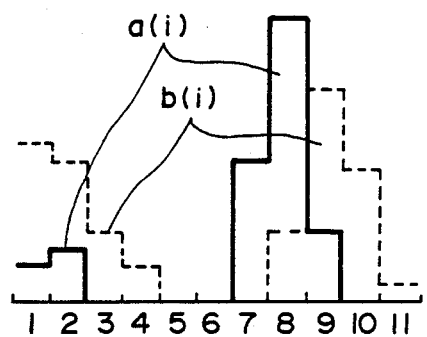
Figure 9:
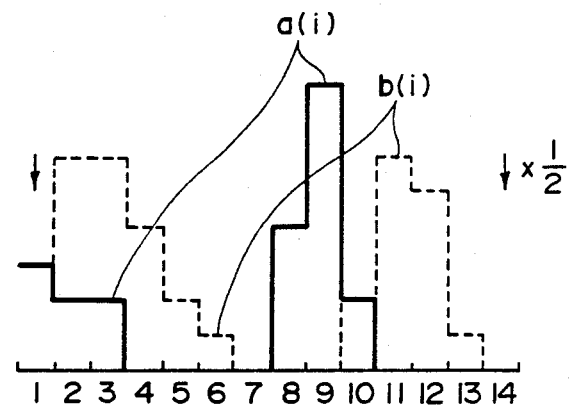
FIG. 9 illustrates the operation when the brightness level is reduced on the basis of a known technique relative to the signals of FIG. 5.
Figures 10A, 10C:
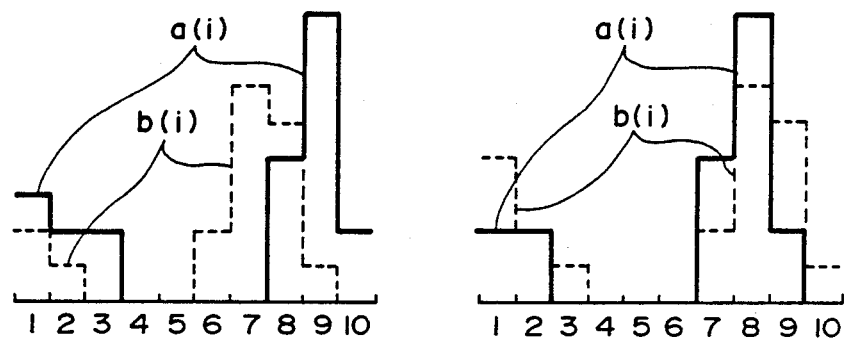
FIGS. 10A, 10B, 10C and 10D illustrate the processes of correlation operation for the signals of FIG. 9.
Figures 10B, 10D:
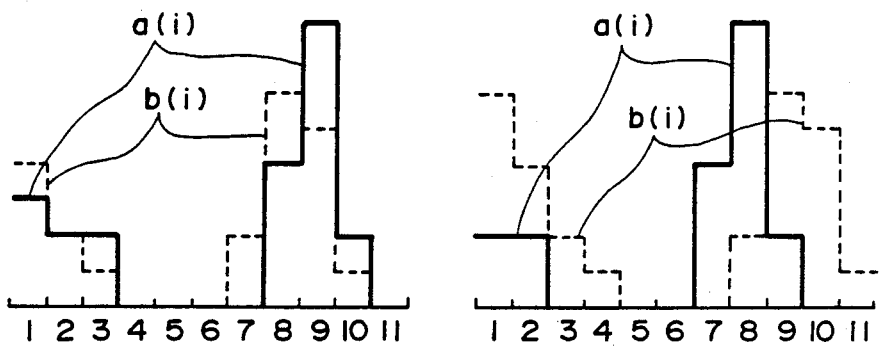
Figure 11B:
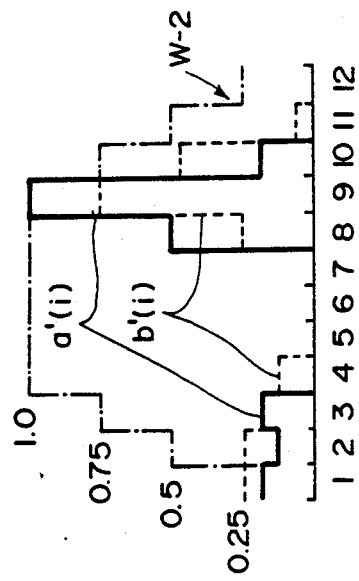
FIGS. 11A and 11B show the signal wave forms when the signals of FIG. 5 are subjected to weighting by the method of the present invention.
Figure 11A:
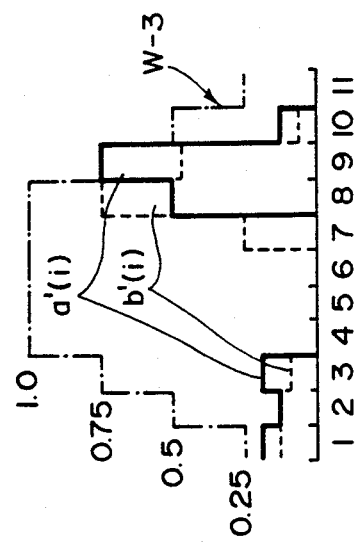
Figure 12A:
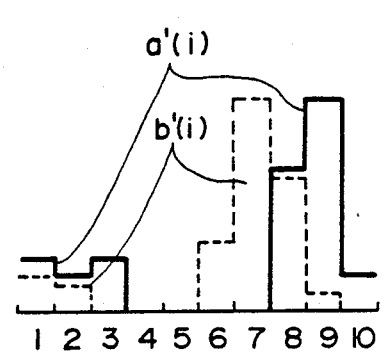
FIGS. 12A, 12B, 12C and 12D illustrate the processes of correlation operation for the signals of FIGS. 11A and 11B.
Figure 12C:
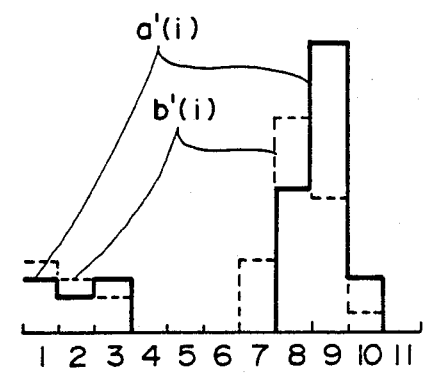
Figure 12B:
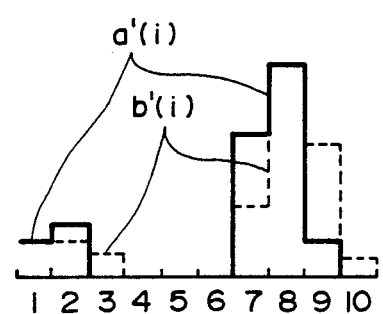
Figure 12D:
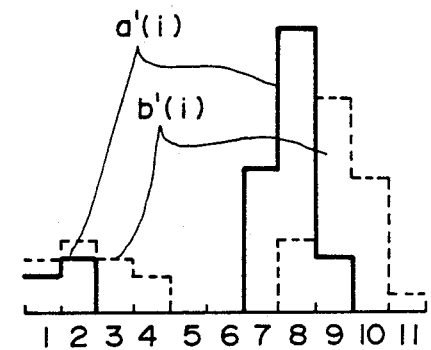

FIG. 11A shows that the operation subject signals are multiplied by such a weight as shown before the aforedescribed V(−3) is operated. That is, signals {a(1), ... a(11)} and {b(4) ... b(14)} which are the subjects of the operation of V(−3) are multiplied by weight functions $w_{-3}(1), \ldots, w_{-3}(11)$, whereafter V(−3) is operated. The first term of the then V(−3) is shown in FIG. 12A and the second term thereof is shown in FIG. 12B. Likewise, FIG. 11B shows the processing for V(−2), and the subjects in this case are {a(1), ..., a(12)} and {b(3), ..., b(14)} and these are multiplied by weight functions $w_{-2}(1), \ldots, w_{-2}(12)$. The first and second terms of the operation of V(−2) are shown in FIGS. 12C and 12D, respectively. When such weighting is effected, V(−3)=262.5 and V(−2)=−287.5, and d≈−2.5 is obtained and a straight interpolated value approximate to the real phase difference can be obtained.

A specific example in which the above-described method is applied to a focus detecting device will now be described with reference to FIGS. 13 and 14.

Figure 13:
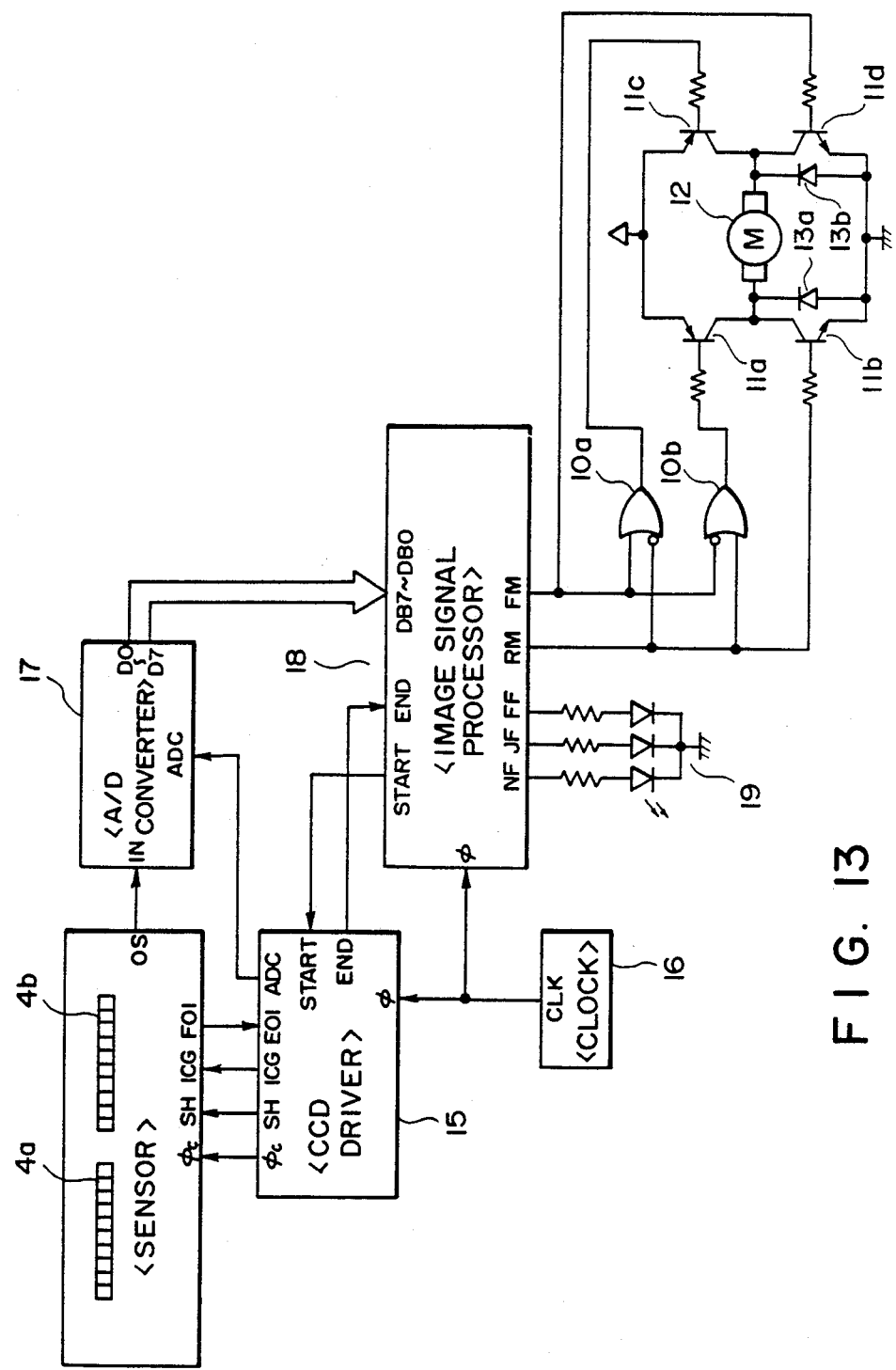
FIG. 13 is a circuit diagram of a focus detecting device to which the method of the present invention is applied.

In FIG. 13, reference numeral 18 designates an image signal processor which may be, for example, a 1-chip microcomputer having a CPU (central processing unit), a memory, input and output terminals, etc. Sensors 4a, 4b each comprise a sensor train 4a, 4b and a CCD (charge coupled device), and two images by light beams passed through different pupil areas of a phototaking lens are formed on the sensor trains 4a and 4b, and the charge accumulation and transfer of the optical images is effected by control signals $\phi_c$, SH and ICG from a CCD driver 15. When the image signal processor 18 gives a start signal START to the CCD driver 15, the CCD driver 15 delivers an accumulation starting signal ICG to the sensor 4 with a clock $\phi_c$ produced by the signal CLK of a clock generator 16. The sensor trains 4a and 4b start the accumulation of the two images from this point of time and, when they reach a predetermined accumulation level, they supply an accumulation completion signal $\overline{EOI}$ to the CCD driver 15. The CCD driver 15 supplies a photoelectrically converted output transfer signal SH to the sensor 4 and causes the accumulated charge to be transferred from the sensor portion to the CCD portion and at the same time, supplies an end signal END to the processor 18. Subsequently, in synchronism with the clock $\phi_c$ from the CCD driver 15, the sensor 4 time-serially puts out the analog photoelectrically converted signal $\overline{OS}$ of the two image to an A/D converter 17, which thus effects 8-bit A/D conversion in synchronism with a conversion signal ADC from the CCD driver 15 and inputs its digital time-serial signals D0-D7 to the terminals DB0-DB7 of the processor 18. The processor 18 detects the degree of correlation of the input signals a(i) and b(i) ($i=1-N$) of the two images, i.e., the phase difference d, in accordance with the flow shown in FIG. 14.

The terminals RM and FM of the processor 18 are output terminals for driving a motor 12 mounted on the photo-taking lens, and when both of the terminals RM and FM are at a high potential (hereinafter simply referred to as "H"), transistors 11a and 11c are turned off through gates 10a and 10b and transistors 11b and 11d are turned on, and an electrical brake is applied to the motor 12 by transistors 11b, 11d and diodes 13a, 13b. When both of the terminals RM and FM are at a low potential (hereinafter simply referred to as "L"), the transistors 11a-11d are all turned off and the motor 12 becomes electrically open. When the terminal RM is at "H" and the terminal FM is at "L", the transistors 11a and 11d are turned off and the transistors 11b and 11c are turned on, and an electric power is supplied to the motor 12 from right to left as viewed in FIG. 13. When the terminal RM is at "L" and the terminal FM is at "H", the transistors 11b and 11c are turned off and the transistors 11a and 11d are turned on, and an electric power is supplied to the motor 12 from left to right as viewed in FIG. 13 and thus, the motor 12 is driven in the direction opposite to the direction in which it is driven when the terminals RM and FM are at "H" and "L", respectively. Terminals NF, JF and FF are the driving terminals of LED 9 for displaying the focusing conditions.

Figure 14:
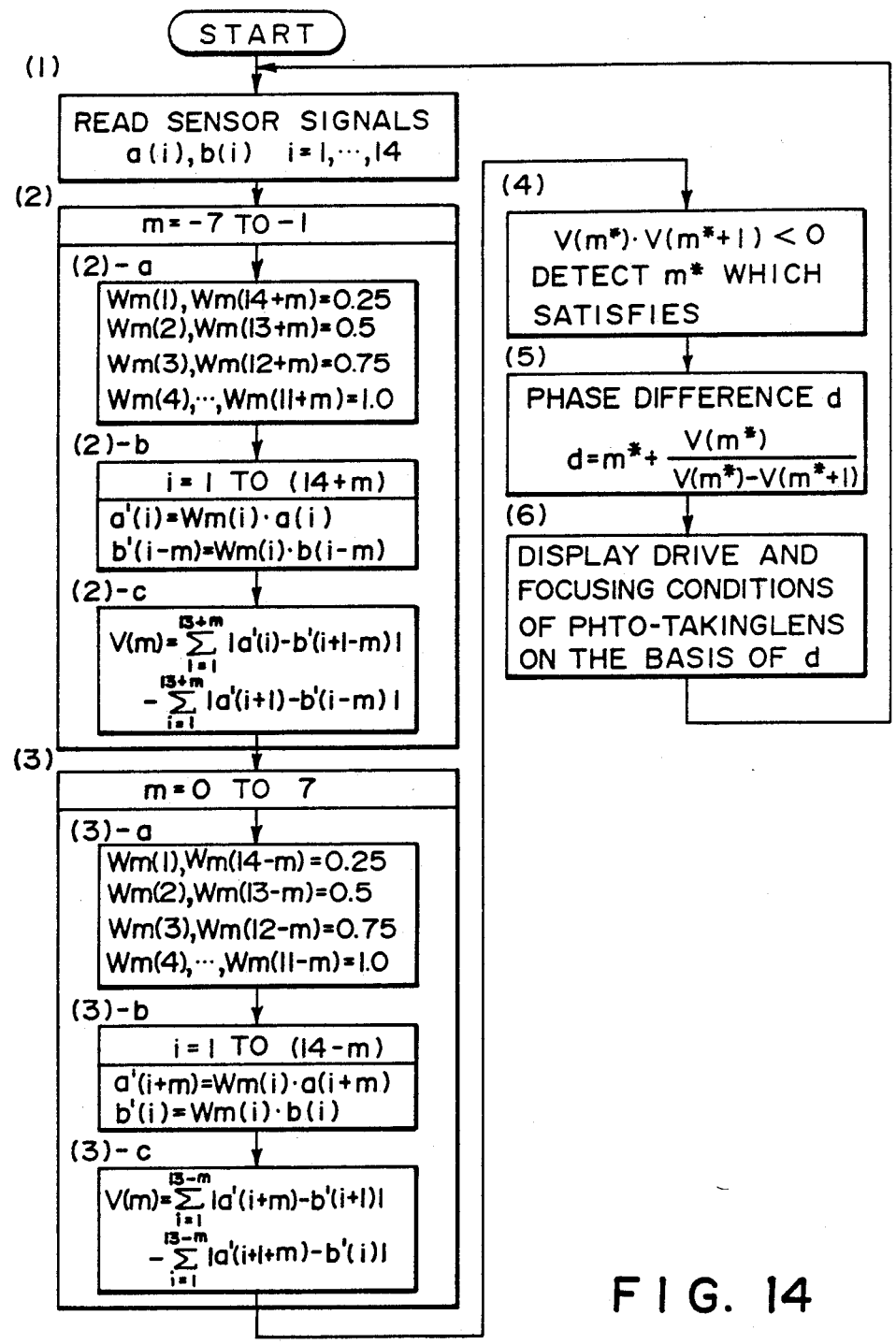
FIG. 14 is an operation flow chart showing the signal processing flow of the processor shown in FIG. 13.

The FIG. 14 shows the operation flow of the microcomputer in the processor 18. The steps will hereinafter be described in detail. It is to be noted that the number of sensors 4 is fourteen pairs.

(1) The photoelectrically converted signals a(i) and b(i) ($i=1, \ldots, 14$) of the two images are read from the sensor.

(2) V(m) in which m is $-7$ to $-1$ is operated. At step (2)−a, as previously described, the weight function wm(i) ($i=1, \ldots, 14+m$) corresponding to m is generated. Then, at step (2)−b, a(i) and b(i−m) ($i=1, \ldots, 14+m$) are multiplied by wm (i) to thereby form a'(i) and b'(i). At step (2)−c, V(m) ($m=-7, \ldots, -1$) is actually operated.

(3) In the same manner as step (2), V(m) in which m is 0 to 7 is operated.

(4)−(6) As previously described, the point d at which V(m) is 0, that is, the degree of correlation, is operated, and the accurate value of d is found on the basis of d by the interpolation, and in conformity with this value, RM and FM signals are formed to drive the photo-taking lens. At the same time, the display of the focusing conditions is effected by diode 19.

Also, in the above-described embodiment, the operation of finding the degree of correlation thereof has been carried out on the basis of equation (1) which is the correlation operation equation, whereas it is apparent that this is not restrictive but said operation is also applicable to the operation of equations (2) and (3).

Further, the predetermined weighting function is not limited to the above-described example, but use may be made of any weighting function which can achieve the objects of the present invention. An of course, other operation method such as division or subtraction rather than the multiplication of the operation signal, will do if it results in a reduction in the component which may cause a detection error.

Another specific embodiment of the present invention will hereinafter be described. In the following specific embodiment, in each process of the aforedescribed correlation operation V(m), correlation is taken with the operation subject signal varying with the variable m after the signal level of the signal components present at the ends of the opposite edge portions at that point of time has been reduced, whereby the adverse effect of the then information of the edge portion is mitigated over all the area of m.

FIGS. 15 and 16 show another specific embodiment in which the present invention is applied to the focus detecting method of a camera. This specific application of the present invention will hereinafter be described with reference to these figures.

Figure 15A:
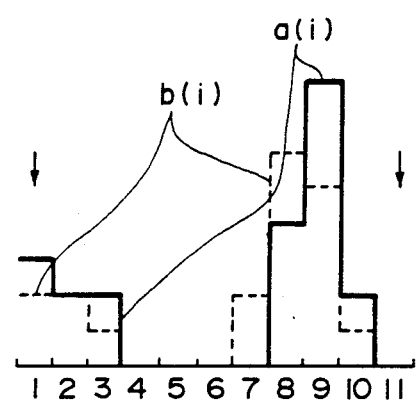
FIGS. 15A and 15B show the signal wave forms of the signals of FIG. 5 subjected to weighting by the method of the present invention.
Figure 15B:
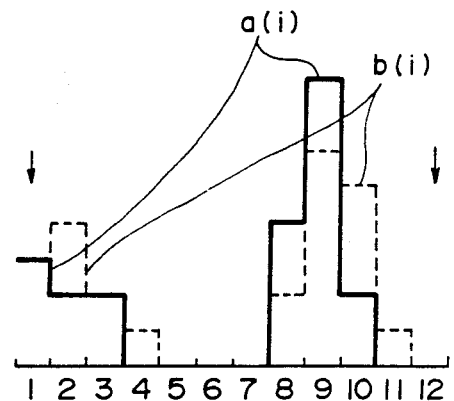
Figure 16A:
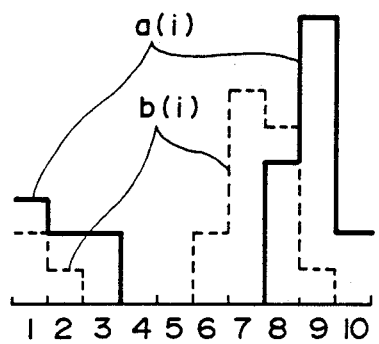
FIGS. 16A, 16B, 16C and 16D illustrate the processes of correlation operation for the signals of FIGS. 15A and 15B.
Figure 16C:
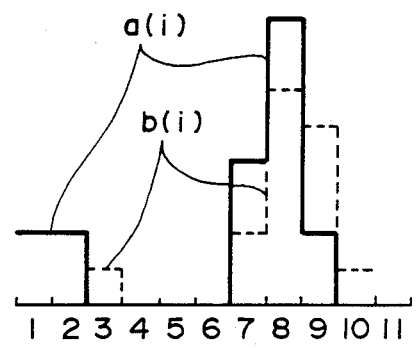
Figure 16B:
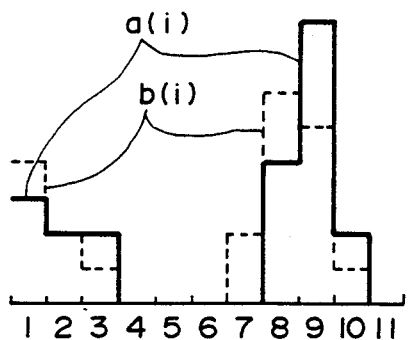
Figure 16D:
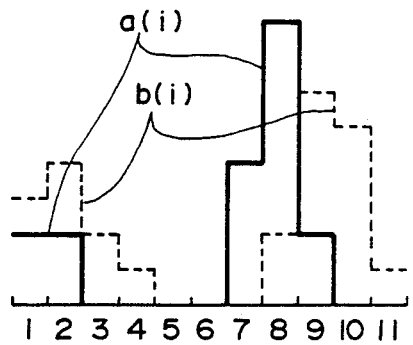

FIG. 15A shows that the signal level of the opposite edge portions has been reduced to a half before the aforedescribed V(−3) is operated. That is, of the signals {a(1), ..., a(11)} and {b(4), ..., b(14)} which are the subjects of the operation of V(−3) in equation (1), the signal level of a(1), a(11), B(4) and b(14) which are the ends is reduced to a half, whereafter V(−3) is operated. The state corresponding to the first term of equation (1) of them V(−3) is shown in FIG. 16A, and the second term of equation (1) is shown in FIG. 16B. Likewise, FIG. 15B shows the operation before the operation of V(−2), and signals which are the subjects in this case are {a(1), ..., a(12)} and {b(3), ..., b(14)}, and the signal level of a(1), a(12), b(3) and b(14) which are the then ends is reduced to a half. FIGS. 16C and 16D show the first and second terms, respectively, of the operation of equation (1) of V(−2). If operation is actually effected by these, $V(-3)=325$ and $V(-2)=-400$, and $d \approx -2.5$ is obtained, and a straight line interpolated value approximate to the real phase difference can be obtained.

Figure 17:
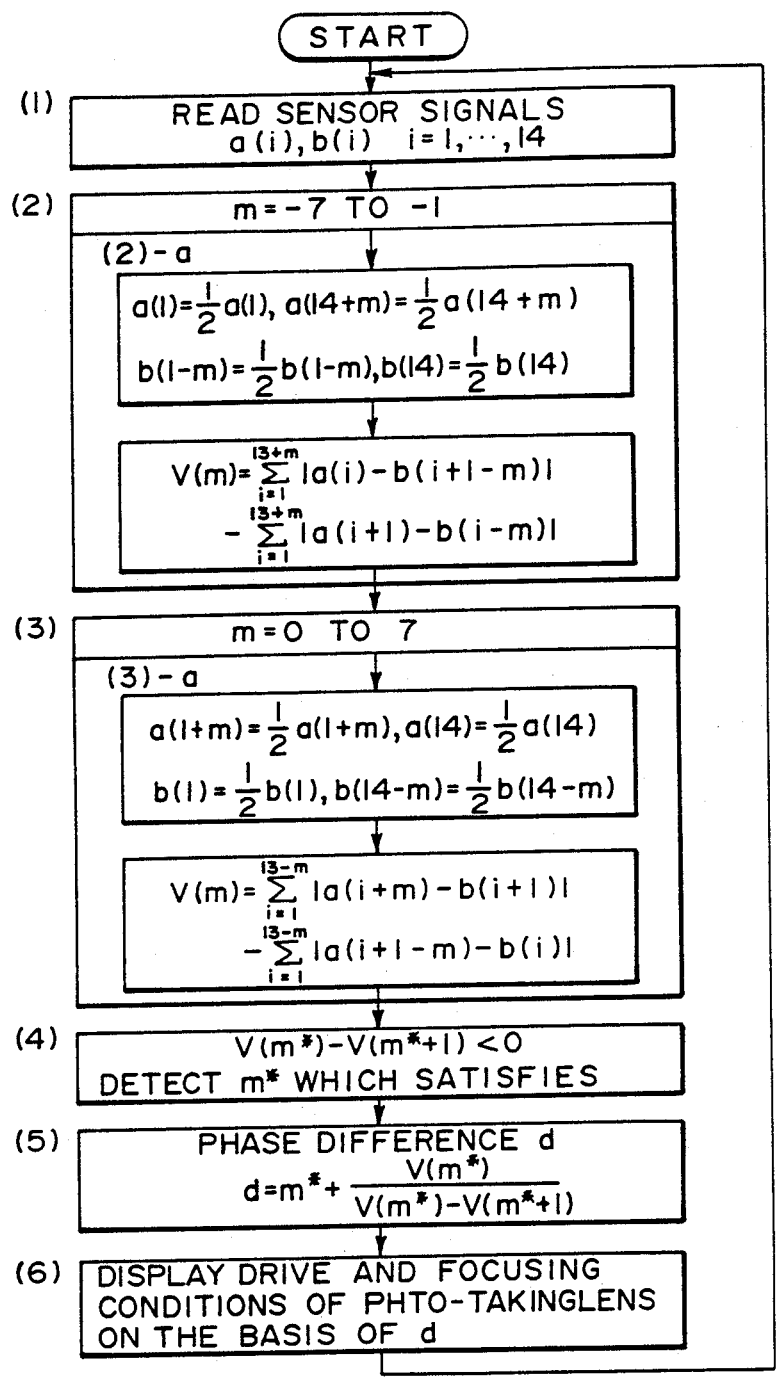
FIG. 17 is an operation flow chart showing the signal processing flow of the processor shown in FIG. 13.

In order to reduce the signal component at the edge portion of the signal train as shown in FIGS. 15 and 16, the microcomputer in the processor 18 (FIG. 13) effects its operation control by the steps according to the flow shown in FIG. 17.

The steps will hereinafter be described in detail. It is to be noted that the number of sensors is fourteen pairs.

(1) The photoelectrically converted signals a(i) and b(i)($i=1, \ldots, 14$) of the two images are read from the sensor 4.

(2) V(m) in which m is $-7$ to $-1$ is operated. At step (2)−a, as previously described, the signal component of the signal ends a(1), a(14+m) and b(14), b(1−m) is increased to $\frac{1}{2}$ times, and at step (2)−b, V(m) is operated in accordance with equation (1).

(3) Subsequently, V(m) in which m is 0 to 7 is operated in the same manner as step (2). At step (3)−a, the signal component of the signal ends is increased to $\frac{1}{2}$ times in the same manner as step (2).

(4)−(6) The zero-crossing m as previously described is found by correlation operation at step (4), and the degree of correlation (phase difference) d is operated at step (5), and on the basis of d, a control signal is put out from the terminals RM and FM and display terminals NF, JF and FF of the processor 18, and the drive and display of focusing conditions of the photo-taking lens is effected on the basis of this signal.

It is apparent that the signal processing method according to the present invention is not restricted to the correlation operation of equation (1), but is also applicable to the operation of equations (2) and (3).

Of course, instead of the above-described example in which the ends of the signal train are reduced to ½, the reduced value may be any value.

According to the present invention, as described above, correlation is taken after the then signal level of the ends of the operation subject signal varying in each process of the correlation operation has been reduced, whereby a correlation operation having a small error can be accomplished over all processes, and this has a wide range of application such as the above-described focus detecting device for an automatic control instrument, etc. and is highly effective for various applied devices for finding various correlations.

We claim:

1. A device for detecting the focusing condition of an objective lens, the device comprising:
   optical means for forming an image of an object having a parallax from light passed through said objective lens;
   light-receiving means for receiving a distribution of light formed by the image, said light-receiving means having a plurality of photosensors; and
   operational means for effecting a correlation operation in accordance with the relative position of two signal trains formed from outputs of said light-receiving means and shifted relative to one another, the signal levels of at least the opposite ends of an overlapped region of said signal trains being reduced relative to a central portion of the overlapped region.

2. A device according to claim 1, wherein said operational means imparts a predetermined weighting function to said signal trains and reduces the signal levels thereof.

3. A device according to claim 1, wherein said operational means imparts a coefficient smaller than 1 to signals at the opposite ends of said signal trains and reduces the signal levels thereof relative to the signals at a central portion of said signal trains.

4. A method for detecting the degree of correlation between two signal trains each including a plurality of signals, the method comprising the steps of:
   repeatedly applying, in accordance with a predetermined algorithm, a correlation operation to corresponding signals of the signal trains as the signal trains are shifted relative to one another; and
   applying, to each of the signal trains, for each correlation operation, a weighted function corresponding to the amount of shift between the signal trains.

5. A method for detecting the degree of correlation between two signal trains each including a plurality of signals, the method comprising the steps of:
   repeatedly applying, in accordance with a predetermined algorithm, a correlation operation to corresponding signal of the signal trains as the signal trains are shifted relative to one another; and
   reducing, each time the signal trains are shifted relative to one another, the signal level of at least the opposite ends of a region in which the two signal trains overlap.

6. A method according to claim 5, wherein the relative shift between the signal trains is effected while an absolute value or an accumulated value of the corresponding signals in said signal trains is integrated.

7. A method according to claim 5, wherein the relative shift between the signal trains is effected while a larger or smaller value of the corresponding signals in said signal trains is integrated.

* * * * *

UNITED STATES PATENT AND TRADEMARK OFFICE
CERTIFICATE OF CORRECTION

PATENT NO. : 4,739,157
DATED : April 19, 1988
INVENTOR(S) : AKIRA AKASHI, ET AL.

Page 1 of 2

It is certified that error appears in the above-identified patent and that said Letters Patent is hereby corrected as shown below:

AT [57] IN THE ABSTRACT

Line 8, "position" should read --portion--.

IN THE DRAWINGS

Sheet 10, Figure 14, "PHTO-TAKINGLENS" should read --PHOTO-TAKING LENS--.
    Sheet 12, Figure 17, "PHTO-TAKINGLENS" should read --PHOTO-TAKING LENS--.

COLUMN 1

Line 33, "generate" should read --to generate--.
    Line 41, "the" (second occurrence) should be deleted.
    Line 44, "that in" should read --in that--.

COLUMN 2

Line 7, "respecitve" should read --respective--.
    Line 27, "the the" should read --the--.
    Line 31, "phtoelectrically" should read --photoelectrically--.
    Line 32, "(a)i" should read --a(i)--.
    Line 46, "or" should be inserted between equations "(2)" and "(3)".
    Line 50, "wherein {x,y}" should read --where min {x,y}--.

COLUMN 3

Line 35, "calculated" should read --calculated,--.
    Line 60, "W(1)" should read --w(1)--.

UNITED STATES PATENT AND TRADEMARK OFFICE
CERTIFICATE OF CORRECTION

PATENT NO. : 4,739,157
DATED : April 19, 1988
INVENTOR(S) : AKIRA AKASHI, ET AL.

It is certified that error appears in the above-identified patent and that said Letters Patent is hereby corrected as shown below:

COLUMN 6

Line 68, "image" should read --images--.

COLUMN 7

Line 35, "The" should be deleted.
    Line 67, "of course, other" should be deleted.
    Line 68, "subtraction" should read --subtraction,--.

COLUMN 8

Line 24, "B(4)" should read --b(4)--.
    Line 27, "them" should read --then--.

COLUMN 10

Line 23, "signal" (first occurrence) should read --signals--.

Signed and Sealed this

Sixteenth Day of May, 1989

Attest:

DONALD J. QUIGG

Attesting Officer      Commissioner of Patents and Trademarks